United States Patent Office — 3,485,861, Patented Dec. 23, 1969

3,485,861
PROCESS FOR REDUCING UNSATURATION IN POLY(OXYALKYLENE)POLYOLS
Robert L. McKellar and Martin C. Musolf, both c/o Dow Corning Corp., Midland, Mich. 48641
No Drawing. Filed May 31, 1966, Ser. No. 553,655
Int. Cl. C07f 7/08
U.S. Cl. 260—448.2                    13 Claims

---

ABSTRACT OF THE DISCLOSURE

A process is disclosed for reducing the amount of unsaturation in poly(oxyalkylene)polyols. The process involves mixing a siloxane containing at least two silicon bonded hydrogen atoms per molecule with the polyol and reacting the siloxane and polyol in the presence of a platinum catalyst.

---

This invention relates to a process for reducing the amount of unsaturation in poly(oxyalkylene)polyols.

The presence of unsaturation in poly(oxyalkylene) polyols is well known. Some efforts have been spent on various methods of controlling the amount of unsaturation in poly(oxyalkylene)polyols, however, most of these efforts have been in the area of production techniques and have been of little, if any, practical benefit. The commercial poly(oxypropylene)diols used in the preparation of urethane elastomers have been of particular concern because instead of being 100% dihydroxy functional polymer molecules, varying amounts of molecules are present which contain a hydroxy group on one end and vinylic unsaturation ($CH_2=CH-$) at the other end. Generally speaking, the number of unsaturated mono-hydroxy molecules in the presently available polyols usually does not exceed 50 mol percent (i.e. 50 out of each 100 mols) and frequently does not exceed 25 mol percent. The presence of such mono-hydroxy materials in the poly(oxypropylene)diols seriously affects the properties of urethane elastomers prepared therefrom, the tensile strength, tear strength, modulus and durometer all decreasing as the amount of unsaturation (monohydroxy material) increases.

It is an object of this invention to provide a process for reducing the amount of unsaturation in poly(oxyalkylene)polyols. Another object is to provide a process for reducing the amount of unsaturation in poly(oxypropylene)diols whereby a product is obtained which is useful for preparing urethane elastomers having improved properties, and which product allows more precise control and tailoring of the properties of urethane elastomers produced therefrom. Other objects and advantages of this invention will be obvious to those skilled in the art in the light of the following more detailed description of the invention.

The invention relates to a process for reducing the amount of unsaturation in poly(oxyalkylene)polyols which comprises mixing with the polyol (1) a siloxane containing at least two silicon bonded hydrogen atoms per molecule, and (2) a platinum catalyst, and thereafter reacting the siloxane and polyol.

In essence, it is believed that the process of this invention reduces the amount of unsaturation in the polyols by tying together the unsaturated ends of two molecules with the siloxane to form a single molecule which is difunctional, that is to form a new dihydroxy molecule. Experimental evidence indicates that merely removing the unsaturation in the polyols does not result in improved properties in the elastomers made therefrom, as disclosed supra. This reaction can be illustrated graphically as follows:

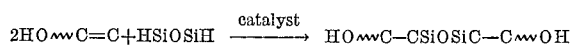

Unsaturation can be removed from any poly(oxyalkylene)polyol employing the process of this invention. The problem of unsaturation is particularly acute, however, in poly(oxypropylene)diols with the amount of unsaturation increasing with increasing molecular weight. A significant amount of unsaturation is also found in poly(oxypropylene)triols and certain poly(oxybutylene)diols.

Any siloxane containing at least two silicon bonded hydrogen atoms per molecule can be used in the process of this invention. The siloxane can be either a homopolymer or a copolymer and can be linear, branched or cyclic in structure. For obvious reasons a relatively low molecular weight material is preferred, especially when the molecule contains only two silicon bonded hydrogen atoms. It has been found that when a siloxane that contains only two silicon bonded hydrogen atoms is employed in the process that there is virtually no increase in the viscosity of the polyol, whereas when a siloxane containing more than two such hydrogen atoms the viscosity of the polyol increases after the reaction. Thus it is possible to control the viscosity of the polyol to meet various needs and whims. In addition to the silicon bonded hydrogen atoms, the silicon atoms can contain any substituents which will not be detrimental to the polyol or which will not be detrimental to other materials with which the polyol is to be reacted or combined. The methyl radical is the preferred substituent from the standpoint of cheapness and availability.

The amount of siloxane used can vary over a wide range from less than to slightly more than enough to provide a stoichiometric amount of silicon bonded hydrogen atoms with respect to the amount of unsaturation in the polyol. This provides a means for controlling the amount of unsaturation in the polyol if some is still desired for, as pointed out supra, the amount of unsaturation in the polyol affects the properties of the products made from it. Generally speaking, it is preferred to use approximately stoichiometric amounts and remove essentially all unsaturation. Then if some unsaturation is desired in the polyol this can be obtained by a blending technique. Care should be taken to avoid large excesses of silicon bonded hydrogen atoms as this can be as detrimental as the unsaturation in the polyol.

The catalyst employed for assisting the reaction between the polyol and the siloxane is platinum. The platinum can be in the form of platinum black, platinized silica gel, platinized asbestos, platinized charcoal, platinized gamma alumina, complexed platinum or chloroplatinic acid, for example, with the latter being preferred. As for the amount of catalyst employed, the maximum amount is merely a matter of economics whereas the minimum amount employed is determined at least to some extent by the type and purity of the reactants. Very low concentrations of platinum, for example about $1 \times 10^{-10}$ mole of platinum per unsaturated molecule, could be used if the reactants were extremely pure. However many reactants, such as the commercial polyols that will normally be used in the process of this invention, contain impurities that poison low concentrations of catalyst and thus it is preferable to use at least $1 \times 10^{-6}$ mole of platinum per unsaturated molecule in the polyol.

The order of mixing the polyol, siloxane and catalyst is not critical so far as is known. The preferred method at this time is to mix the polyol and siloxane, heat this mixture to the desired reaction temperature, add the catalyst, and then allow the reaction to proceed while maintaining the desired temperature. Generally speaking, any temperature from about room temperature to about 150° C. can be used. At this time it is believed that a temperature in the range of 65°–90° C. provides the optimum reaction rate.

It will be obvious to those skilled in the art that compounds other than the siloxanes described herein which are capable of adding to a carbon-carbon double bond can be substituted herein. Such compounds can be either silicon or non-silicon containing. Compounds which contain at least two mercaptan groups are exemplary. The same is true with respect to the catalyst. For example, palladium is known to catalyze the addition of silicon bonded hydrogen atoms to carbon-carbon double bonds and hence could be substituted for the platinum catalyst. While there are other obvious essentially equivalent materials that can be used herein, the siloxanes and platinum described above are by far superior. It should be understood that use of obvious compounds other than the siloxane and platinum constitutes a practice of the invention as disclosed and claimed herein.

Now in order that those skilled in the art may better understand how the present invention can be practiced, the following examples are given by way of illustration and not by way of limitation. All parts and percents are on a weight basis, and all viscosities and refractive indicies measured at 25° C., unless otherwise specified.

EXAMPLE 1

900 g. of a commercial poly(oxypropylene)diol "A" of about 4000 molecular weight and containing about 0.87% hydroxyl groups and 0.0414 equivalents of vinyl unsaturation was placed in a flask with 2.78 g. of symmetrical tetramethyldisiloxane, this being about 0.0414 equivalents of silicon bonded hydrogen atoms (SiH). The mixture was heated to 70° C. and then 18 drops of chloroplatinic acid in dimethylphthalate (0.1 molar) added and the heating and agitation continued for about 10 minutes. The mixture was then cooled, stripped and filtered to obtain the up-graded diol which was a light brown fluid having a viscosity of 890 cs., a refractive index of 1.4495, and which contained about 0.88% hydroxyl groups.

The above procedure was repeated using 3.86 g. of the siloxane, about 0.0576 equivalents of silicon bonded hydrogen atoms, and 900 g. of another lot of commercial poly(oxypropylene)diol "B" which differed from the first one in that it contained about 0.85% hydroxyl groups and 0.0576 equivalents of vinyl unsaturation. The mixture was filtered and stripped to 120° C. at 1 mm. of mercury pressure after the reaction was complete. The resulting up-graded diol had a viscosity of 1014 cs., a refractive index of 1.4495, and contained about 0.825% hydroxyl groups.

To illustrate the utility and advantages of the process of this invention, four urethane elastomers were made employing the following formulation: 200 g. of diol 6 g. of a commercial poly(oxypropylene)triol, 0.2 g. of 2,6-ditertiarybutylphenyl, 112 g. of P–33 carbon black, 0.09 g. of methyltintrichloride, 300 g. of xylene and 17 g. of toluene diisocyanate. The diols used were the commercial ones "A" and "B" as obtained from the manufacturer (for comparison) and the up-graded versions as prepared above. The physical properties of the elastomers is set forth in the table below.

DIOL

| Property | Commercial A | Commercial B | Up-graded A | Up-graded B |
| --- | --- | --- | --- | --- |
| Mole percent unsaturation | 17.6 | 24.2 | | |
| Hardness, initial | 47 | 47 | 56 | 54 |
| Hardness after 10 seconds | 34 | 33 | 35 | 45 |
| Modulus at 150% elongation | 100 | 85 | 161 | 166 |
| Tensile strength (p.s.i.) | 144 | 109 | 548 | 533 |
| Percent elongation | 1,100 | 610 | 1,713 | 1,647 |
| Tear strength (p.l.i.) | 50 | 37 | 88 | 93 |

It will be noted from the above results that as the amount of unsaturation in the diol increases, the physical properties of the elastomer decreases. Up-grading of the diols significantly improved the physical properties of the elastomer and both up-graded materials gave uniform results.

EXAMPLE 2

Into a 50 gallon Pfaudler there was placed 172 kg. of a commercial 4000 m.w. poly(oxypropylene)diol containing about 0.83% hydroxyl groups and 0.063 milliequivalents of vinyl unsaturation per gram and 1460 g. of 1,1,1,3,5,7,7,7 - octamethyltetrasiloxane. The solution was heated to 90° C. and then 0.428 g. of chloroplatinic acid dissolved in isopropanol was added. The solution was then heated at 95°–100° C. for one hour. The resulting up-graded diol had a viscosity of 911 cs., a refractive index of 1.4480, and contained 0.82% hydroxyl groups and only 0.004 milliequivalents of vinyl unsaturation per gram.

EXAMPLE 3

The procedure of Example 2 was repeated using 1182 kg. of the diol 10 kg. of the siloxane and 2.93 g. of the catalyst. The solution was heated about 1½ hours at 90° C. after the catalyst addition. The resulting up-graded diol had a viscosity of 883 cs., a refractive index of 1.4494, and contained 0.84% hydroxyl groups and no measurable vinyl unsaturation.

EXAMPLE 4

815 g. of a commercial 4000 m.w. poly(oxypropylene) diol containing about 0.82% hydroxyl groups and 0.063 milliequivalents of vinyl unsaturation per gram, and 3 g. of methylhydrogen cyclotetrasiloxane were mixed and heated to 90° C. then 0.25 ml. of a 2% solution of chloroplatinic acid in isopropanol was added causing the temperature to rise to 96° C. Heating of the mixture at 90° C. was maintained for one hour after which time the reaction was complete. The resulting up-graded polyol had a viscosity of 1070 cs., a refractive index of 1.4495, and contained about 0.82% hydroxyl groups and 0.00666 milliequivalents of vinyl unsaturation per gram.

EXAMPLE 5

The procedure of Example 4 was repeated except that 5.7 g. of 1,1,1,3,5,7,9,9,9 - nonamethylpentasiloxane was substituted for the siloxane used therein. The addition of the catalyst caused the temperature to rise to 104° C. After the reaction was complete the product was stripped and found to have a viscosity of 1059 cs., a refractive index of 1.4494, and contained about 0.82% hydroxyl groups and 0.02 milliequivalents of vinyl unsaturation per gram.

EXAMPLE 6

400 g. of a commercial poly(oxyethylene-oxypropylene) random copolymer diol of 4000 m.w. containing about 0.86% hydroxyl groups and 0.028 milliequivalents of vinyl unsaturation per gram was mixed with 0.75 g. of symmetrical tetramethyldisiloxane and the mixture then heated to 80° C. Then 0.0259 ml. of a 1% solution of chloroplatinic acid in isopropanol was added and heating continued at 80° C. for one hour. The resulting up-graded diol had a viscosity of 830 cs., a refractive index of 1.4526, and contained about 0.865 hydroxyl groups and only 0.004 milliequivalents of vinyl unsaturation per gram.

EXAMPLE 7

The procedure of Example 6 was repeated except that a 3000 m.w. copolymer diol containing about 1.13% hydroxyl groups was substituted for the diol employed therein. The addition of the catalyst caused the temperature to rise to 92° C. After the reaction was complete the resulting up-graded diol was found to have a viscosity of 550 cs., a refractive index of 1.4524, and to contain about 1.09% hydroxyl groups and 0.011 milliequivalents of vinyl unsaturation per gram.

EXAMPLE 8

300 g. of a commercial 3000 m.w. poly(oxypropylene) diol containing about 1.13% hydroxyl groups and 0.06 milliequivalents of vinyl unsaturation was mixed with 1.2 g. of symmetrical tetramethyldisiloxane and the resulting mixture then heated to 80° C. Then 0.0417 ml. of a 1% solutio of chloroplatinic acid in isopropanol was added which caused the temperature to rise to 87° C. The mixture was then heated for one hour at 90° C. The resulting up-graded diol had a viscosity of 686 cs., a refractive index of 1.4495, and contained about 1.09% hydroxyl groups and 0.015 milliequivalents of vinyl unsaturation per gram.

EXAMPLE 9

400 g. of a commercial 3000 m.w. poly(oxypropylene)-triol containing about 1.7% hydroxyl groups and 0.033 milliequivalents of vinyl unsaturation per gram was heated to 70° C. and then 0.85 g. of symmetrical tetramethyldisiloxane and 6 drops of 0.1 molar solution of chloroplatinic acid in dimethylphthalate was added. Heating was continued for 15 minutes after which time the reaction was complete. The up-graded triol had a viscosity of 481 cs., a refractive index of 1.4505 and contained about 1.73% hydroxyl groups and 0.0037 milliequivalents of vinyl unsaturation per gram.

EXAMPLE 10

The procedure of Example 9 was repeated except that 12 drops of platinum catalyst was employed, 1.78 g. of 1,1,1,3,5,7,7,7 - octamethyltetrasiloxane was substituted for the siloxane used therein, and the triol was heated to 77° C. prior to the addition of the other materials. The mixture was heated to 110° C. over the next 3 hours and then allowed to stand at room temperature overnight. The resulting product had a viscosity of 462 cs., a refractive index of 1.4505, and contained about 1.73% hydroxyl groups and 0.0048 milliequivalents of vinyl unsaturation per gram.

That which is claimed is:

1. A process for reducing the amount of unsaturation in poly(oxyalkylene)polyols which comprises mixing with the polyol (1) a siloxane containing at least two silicon bonded hydrogen atoms per molecule, and (2) a platinum catalyst, and thereafter reacting the siloxane and the polyol.

2. The process of claim 1 wherein the polyol is a diol.

3. The process of claim 2 wherein the diol is a poly-(oxypropylene)diol and the amount of siloxane employed is such that the amount of silicon bonded hydrogen atoms is about stoichiometrically equivalent to the amount of unsaturation in the diol.

4. The process of claim 3 wherein the diol has an average molecular weight of about 4000.

5. The process of claim 4 wherein the siloxane is symmetrical tetramethyldisiloxane.

6. The process of claim 4 wherein the siloxane is 1,1,1,3,5,7,7-octamethyltetrasiloxane.

7. The process of claim 4 wherein the siloxane is 1,1,1,3,5,7,9,9,9-nonamethylpentasiloxane.

8. The process of claim 4 wherein the siloxane is methylhydrogen cyclotetrasiloxane.

9. The process of claim 1 wherein the polyol is a triol.

10. The process of claim 9 wherein the triol is a poly-(oxypropylene)triol and the amount of siloxane employed is such that the amount of silicon bonded hydrogen atoms is about stoichiometrically equivalent to the amount of unsaturation in the triol.

11. A poly(oxyalkylene)polyol produced by the process of claim 1.

12. A poly(oxypropylene)diol produced by the process of claim 3.

13. A poly(oxypropylene)triol produced by the process of claim 10.

References Cited

UNITED STATES PATENTS

| | | |
|---|---|---|
| 3,172,899 | 3/1965 | Bailey. |
| 3,317,460 | 5/1967 | Clark et al. _____ 260—448.2 X |
| 3,355,473 | 11/1967 | Clark et al. |
| 3,381,019 | 4/1968 | Morehouse _____ 260—448.2 X |

DANIEL E. WYMAN, Primary Examiner

P. F. SHAVER, Assistant Examiner

U.S. Cl. X.R.

260—615, 858